United States Patent
Van Eaton et al.

(10) Patent No.: US 8,730,608 B1
(45) Date of Patent: May 20, 2014

(54) DUAL FLYING HEIGHT CONTROL IN A DISK DRIVE

(71) Applicant: LSI Corporation, San Jose, CA (US)

(72) Inventors: Thomas C. Van Eaton, Longmont, CO (US); Jun Oie, Kanagawa (JP); Daniel J. Dolan, Jr., Cottage Grove, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/930,215

(22) Filed: Jun. 28, 2013

Related U.S. Application Data (60) Provisional application No. 61/835,265, filed on Jun. 14, 2013.

(51) Int. Cl.
*G11B 5/02* (2006.01)
(52) U.S. Cl.
USPC ............................................. 360/59
(58) Field of Classification Search
None
See application file for complete search history.

(56) References Cited

U.S. PATENT DOCUMENTS

| | | |
|---|---|---|
| 8,098,450 B2 | 1/2012 | Baumgart et al. |
| 2012/0300334 A1 | 11/2012 | Hsiao et al. |

OTHER PUBLICATIONS

Uwe Boettcher et al., "Dynamic Flying Height Adjustment in Hard Disk Drives Through Feedforward Control," IEEE Transactions on Magnetics, vol. 47, No. 7, pp. 1823-1829, Jul. 2011.
"Thermal Fly-height Control (TFC) Technology in HGST Hard Disk Drives," HGST Whitepaper, Western Digital Company, Nov. 2007, pp. 1-3.

*Primary Examiner* — Paul Huber
(74) *Attorney, Agent, or Firm* — Otterstedt, Ellenbogen & Kammer, LLP (57) ABSTRACT

A read/write head for reducing flying height in a disk drive apparatus includes a write transducer for storing data on a storage medium, a read transducer for reading data from the storage medium, and read and write heater elements configured so that during read/write operations, heat dissipated in the read heater element is greater than heat dissipated in the write heater element. A control pad in the head receives current supplied to the read and write heater elements during read and write operations. During the write operation, protrusion of the read/write head attributable to the write transducer and the write heater element is greater than a protrusion of the head attributable to the read heater element. During the read operation, protrusion of the read/write head attributable to the read heater element and the read transducer is greater than a protrusion of the head attributable to the write heater element.

24 Claims, 5 Drawing Sheets

*FIG. 9*

DUAL FLYING HEIGHT CONTROL IN A DISK DRIVE

CROSS-REFERENCE TO RELATED APPLICATION(S)

This application claims priority to U.S. Provisional Application No. 61/835,265 filed on Jun. 14, 2013, the complete disclosure of which is incorporated herein by reference in its entirety.

FIELD OF INVENTION

The present invention relates generally to electrical and electronic apparatus, and more particularly relates to controlling flying height in a disk drive.

BACKGROUND

The storage capacity of conventional hard disk drives has greatly increased over recent years. Advances in disk drive technology have decreased the surface area required to reliably and retrievably store a bit along a "track" on the disk surface, and have also decreased the spacing between adjacent tracks. This reduction in the active disk surface area per unit of storage has been enabled, in large part, by corresponding reductions in the size and precision of magnetic transducer elements, often referred to as "heads," used for reading and writing operations in magnetic disk drives.

A magnetic disk drive includes, in a basic implementation, one or more rotating magnetic disks on which data can be stored, read and write heads that are suspended adjacent to a surface of the magnetic disk(s) by a suspension arm, and an actuator which controls a position of the suspension arm so as to place the read and write heads over selected tracks on the rotating magnetic disk(s) during reading and writing operations. Two key technologies in achieving higher storage density in hard disk drives are a reduction in the clearance between the read/write head and the magnetic disk and the minimization of flying height variations to maintain low bit error rates.

As the suspension arm flies over the surface of the rotating magnetic disk, the spacing between the read/write head and the magnetic disk defines the flying height. The performance of read and write operations in the disk drive increases exponentially with decreased flying height, and thus the read/write head is generally positioned as close to the surface of the disk as possible. However, the read/write head cannot physically contact the disk, since this could result in damage to the head and/or disk (e.g., hard disk crash). Consequently, the read/write head must be spaced far enough from the surface of the magnetic disk to accommodate for flying height variations which may occur during operation of the disk drive, including, for example, differences in disk thickness and/or planarity resulting from manufacturing and deformations caused by thermal expansion of the disk and/or head.

SUMMARY

Embodiments of the invention are broadly related to techniques for independently controlling heater elements in a read/write head of a disk drive to thereby reduce fly height of the head in both read and write modes. Moreover, techniques according to embodiments of the invention achieve a reduction in fly height of the read/write head while beneficially reducing a size and complexity of control circuitry associated with the head.

In accordance with an embodiment of the invention, a method of reducing flying height in a disk drive apparatus includes the steps of: providing at least one read/write head, the read/write head comprising at least one read transducer element, at least one write transducer element, at least one read heater element, and at least one write heater element; configuring the read and write heater elements such that heat dissipated in the read heater element is greater than heat dissipated in the write heater element; and supplying a current to the read and write heater elements via a same control pad during at least a portion of a read operation and during at least a portion of a write operation, wherein during the write operation, a protrusion of the read/write head toward a surface of a magnetic storage medium corresponding to the read/write head attributable to the write transducer element and the write heater element is greater than a protrusion of the read/write head toward the surface of the magnetic storage medium attributable to the read heater element, and wherein during the read operation, a protrusion of the read/write head toward a surface of the magnetic storage medium attributable to the read heater element and the read transducer element is greater than a protrusion of the read/write head attributable to the write heater element.

In accordance with another embodiment of the invention, a read/write head for reducing flying height in a disk drive apparatus includes at least one write transducer element operative to store binary encoded information on a storage medium, at least one read transducer element operative to decode stored binary information from the storage medium, at least one read heater element and at least one write heater element. The read and write heater elements are configured so that during read and write operations, heat dissipated in the read heater element is greater than heat dissipated in the write heater element. The read/write head further includes a control pad adapted to receive a current supplied to the read and write heater elements during at least a portion of the read operation and during at least a portion of the write operation. During the write operation, a protrusion of the read/write head toward a surface of a magnetic storage medium in the disk drive apparatus corresponding to the read/write head attributable to the write transducer element and the write heater element is greater than a protrusion of the read/write head toward the surface of the magnetic storage medium attributable to the read heater element, and during the read operation, a protrusion of the read/write head toward a surface of the magnetic storage medium attributable to the read heater element and the read transducer element is greater than a protrusion of the read/write head attributable to the write heater element, such that flying height of the disk drive apparatus is reduced.

In accordance with yet another embodiment, a data storage system comprises at least one disk drive apparatus having reduced flying height. The disk drive apparatus includes a magnetic storage medium and a read/write head. The read/write head comprises at least one write transducer element operative to store binary encoded information on the magnetic storage medium, at least one read transducer element operative to decode stored binary information from the magnetic storage medium, at least one read heater element and at least one write heater element. The read and write heater elements are configured so that during read and write operations, heat dissipated in the read heater element is greater than heat dissipated in the write heater element. The read/write head further includes a control pad for receiving a current supplied to the read and write heater elements during at least a portion of the read operation and during at least a portion of the write operation. During the write operation, a protrusion of the read/write head toward a surface of the magnetic storage medium attributable to the write transducer element and the write heater element is greater than a protrusion of the read/write head toward the surface of the magnetic storage medium attributable to the read heater element. During the read operation, a protrusion of the read/write head toward a surface of the magnetic storage medium attributable to the read heater element and the read transducer element is greater than a protrusion of the read/write head attributable to the write heater element, such that flying height of the disk drive apparatus is reduced.

Embodiments of the invention will become apparent from the following detailed description thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative arrangements for reducing flying height of a read/write head in a magnetic disk drive apparatus in a manner which reduces the size and complexity of control circuitry utilized in the disk drive. It should be understood, however, that embodiments of the invention are not limited to these or any other particular disk drive arrangements. Rather, embodiments of the invention are more broadly related to techniques for independently controlling the flying height of a read/write head operative in multiple modes using a single control pad. Moreover, it will become apparent to those skilled in the art given the teachings herein that numerous modifications can be made to the embodiments shown that are within the scope of the claimed invention. For example, although illustrative embodiments of the invention will be described herein in the context of disk drive apparatus comprising a single read/write head and a single corresponding magnetic disk, embodiments of the invention may include a plurality of read/write heads and corresponding disks. Thus, no limitations with respect to the embodiments shown and described herein are intended or should be inferred.

As a preliminary matter, for the purposes of clarifying and describing embodiments of the invention, the following table provides a summary of certain acronyms and their corresponding definitions, as the terms are used herein:

| Table of Acronym Definitions | |
|---|---|
| Acronym | Definition |
| HDD | Hard disk drive |
| ISI | Intersymbol interference |
| ATI | Adjacent track interference |
| SNR | Signal-to-noise ratio |
| DAC | Digital-to-analog converter |
| IC | Integrated circuit |
| HSA | Head suspension assembly |
| ESD | Electrostatic discharge |
| LSB | Least significant bit |
| HGA | Head gimbal assembly |
| RAID | Redundant array of independent disks |
| SSD | Solid-state drive |

As previously stated, the performance of read and write operations in a disk drive apparatus (e.g., hard disk drive (HDD)) increases exponentially with decreasing flying height. The term "flying height" (or "fly height") as used herein is intended to broadly refer to the spacing between a read/write head and a storage medium (e.g., magnetic disk). Reducing the flying height, and thereby decreasing the spacing between the read/write head and the corresponding storage medium, advantageously reduces intersymbol interference (ISI) and adjacent track interference (ATI) during write operations and improves signal and signal-to-noise ratio (SNR) during read operations, among other benefits. Consequently, the read/write head is typically positioned as close to the disk surface as possible without physically contacting the disk, since this could result in damage to the head and/or disk.

Unfortunately, the spacing between the read/write head and the disk is not constant, but rather can vary under normal operation of the HDD. For example, during a write operation, a write transducer element in the read/write head causes a thermal deformation of the air bearing surface in a direction towards the disk, resulting primarily from write current induced pole tip protrusion of the write element. This phenomenon causes a different flying height during writing compared to reading. Other causes of variation in the flying height include, but are not limited to, manufacturing differences (e.g., disk thickness and/or planarity) and environmental conditions (e.g., operating temperature inside the disk drive unit).

Historically, a heater element was first introduced in the read/write head proximate the write transducer element. Even though the write element protrudes with write current, the amount of current selected is generally related to properties of the heads and media, and not used to directly control the flying height. With the introduction of the write heater, an improvement in write performance could be obtained from an otherwise poor flying head; the next step was to improve the read flying height by adding a read heater element.

In order to mitigate differences in the flying height for read and write operations, it is known to include a heater element positioned in close proximity to a read transducer element in the read/write head. Activating the heater element during a read operation causes a protrusion of the read element which is preferably matched to the protrusion of the write element during the write operation. By providing separate read and write heater elements positioned in close proximity to the read and write transducer elements, respectively, more precise control over the flying height can be achieved in both read and write modes of operation. However, having independent control of the read and write heater elements, using conventional means, doubles the control circuitry, increases the size of digital-to-analog converters (DACs) used in the disk drive for powering each heater element, increases the number of input/output control pads, which significantly increases integrated circuit (IC) die size, and complicates a head suspension assembly (HSA) used as an interconnect between the head and a preamplifier, among other disadvantages. The additional control circuitry also increases testing time and makes the disk drive apparatus more susceptible to damage due to electrostatic discharge (ESD), which are undesirable.

Figure 1:
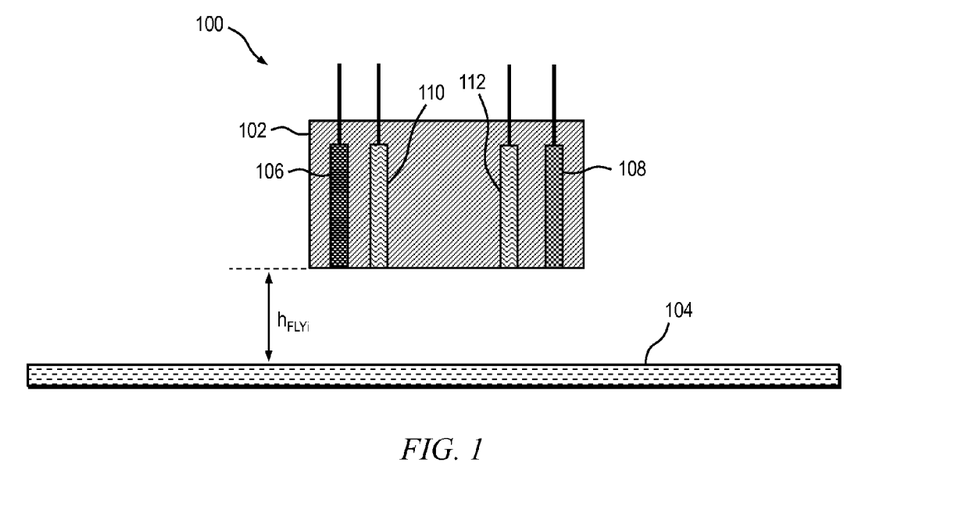
FIG. 1 is a side view depicting at least a portion of an exemplary disk drive apparatus in which embodiments of the present invention may be employed.

FIG. 1 is a side view depicting at least a portion of an exemplary disk drive apparatus 100 in which embodiments of the present invention may be employed. The disk drive apparatus 100 includes at least one read/write head 102 and at least one corresponding rotating magnetic disk 104, or alternative storage medium, on which data can be stored. The read/write head 102 comprises a write transducer element 106 and a read transducer element 108. In the context of a magnetic data storage and retrieval system, the write transducer element 106 comprises a magneto-resistive write head used to store binary (i.e., two-state) data on a magnetic storage medium, such as, for example, a magnetic tape or magnetic disk (e.g., disk 104). The write (or recording) head, in one embodiment, comprises an inductive coil which is adapted to store binary encoded information (i.e., data) as magnetic flux patterns imparted on the magnetic disk 104 as the disk passes by the write element. A direction of the individual magnetic flux patterns is controlled as a function of a direction of write current, $I_W$, passing through the write element 106, with alternate directions being indicative of the respective logical states of the data to be stored. Similarly, the read transducer element 108 comprises a magneto-resistive read head operative to sense the magnetic flux patterns stored on the disk 104 and to decode the stored data as a function of the sensed magnetic flux patterns.

The read/write head 102 further comprises separate write and read heater elements, 110 and 112, respectively. The write and read heater elements 110, 112 are positioned proximate to the write transducer element 106 and read transducer element 108, respectively, in the read/write head 102. The write and read heater elements 110, 112 are, in one or more embodiments, formed as resistive elements (e.g., resistors), although embodiments of the invention are not limited to resistive heater elements, but rather may comprise essentially any controllable heat generating elements, such as, but not limited to, chemically-based heater elements (e.g., heater elements utilizing a chemical reactant which is capable of undergoing an exothermic metal oxidation-reduction reaction within an enclosure).

The read/write head 102 is suspended adjacent to a surface of the magnetic disk 104 by a suspension arm and an actuator, neither of which are explicitly shown in FIG. 1, in a conventional manner, as will be known by those skilled in the art. The actuator controls a position of the suspension arm so as to place the read and write transducer elements 108, 106 in the read/write head 102 over selected tracks on the rotating magnetic disk 104 during reading and writing operations. A mechanism for rotating the magnetic disk 104 relative to a fixed read/write head 102 (e.g., disk spindle and drive motor), or alternatively, moving the read/write head relative to a fixed storage medium (or a combination thereof), has also been omitted from FIG. 1 merely for economy of description. Mechanisms for moving the disk 104 relative to the read/write head 102 are well known by those skilled in the art, and therefore a detailed discussion thereof will not be presented herein.

A flying height, $h_{FLY}$, defines an initial spacing between the read/write head 102 and the disk 104 when the disk drive 100 is in a quiescent or otherwise static state. In this quiescent state, wherein no reading or writing operations take place, there will be no current flowing into the read transducer element 108, the write transducer element 106, or the read and write heater elements 112, 110. In this instance, the spacing between the read transducer element 108 and the disk 104 is substantially the same as the spacing between the write transducer element 106 and the disk. Manufacturing and assembly may result in some difference in flying height between the read and write transducer elements, but such differences can be overcome by the heater elements.

Figure 2:
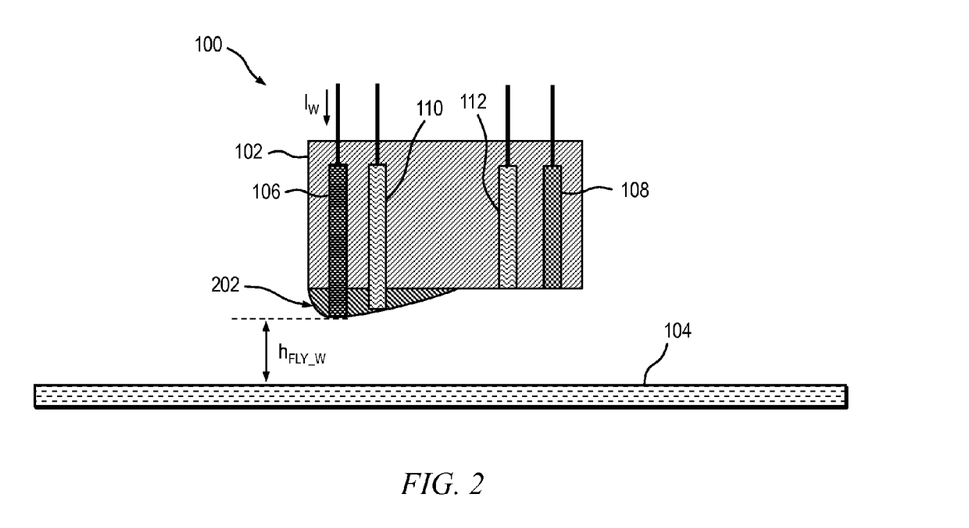
FIG. 2 is a side view depicting at least a portion of the exemplary disk drive apparatus shown in FIG. 1 during a write operation without activation of a write heater element.

FIG. 2 is a side view depicting at least a portion of the exemplary disk drive apparatus 100 shown in FIG. 1 during a write operation without activation of the write heater element 110. Specifically, during the write operation, a write current, $I_W$, is supplied to the write transducer element 106 in the read/write head 102. The write current $I_W$ flowing through the write element 106 causes the write element to heat up, creating a protrusion 202 of the read/write head 102 toward the surface of the disk 104. This protrusion 202 of the write element 106 results in a decrease in the spacing between the read/write head 102 and the disk 104, and therefore a flying height, $h_{FLY\_W}$, during the write operation will be reduced compared to the initial flying height $h_{FLY}$ (i.e., $h_{FLY\_W} = h_{FLY} -$ write element protrusion).

Figure 3:
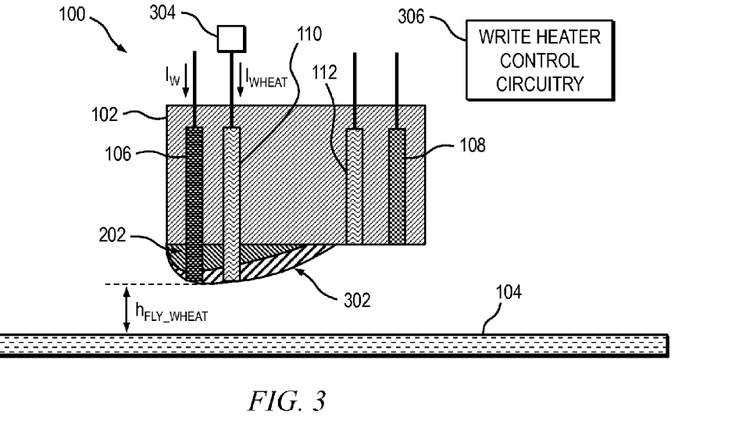
FIG. 3 is a side view depicting at least a portion of the exemplary disk drive apparatus shown in FIG. 1 during a write operation with activation of the write heater element.

FIG. 3 is a side view depicting at least a portion of the exemplary disk drive apparatus 100 shown in FIG. 1 during a write operation with activation of the write heater element 110. Specifically, during the write operation, a write current, $I_W$, is supplied to the write transducer element 106 in the read/write head 102 and, substantially concurrently with activation of the write element, the write heater element 110 is activated by supplying a write heater current, $I_{WHEAT}$, to the write heater element via a first control pad 304. The write heater current $I_{WHEAT}$ is generated by write heater control circuitry 306 and is supplied to the write heater element 110 via pad 304. The write current $I_W$ flowing through the write element 106 causes the write element to heat up, thereby creating the protrusion 202 of the read/write head 102. Similarly, the write heater current $I_{WHEAT}$ flowing through the write heater element 110 causes the write heater element to heat up, thereby creating a further protrusion 302 of the read/write head 102 toward the surface of the disk 104. The protrusion 202 attributable to the write transducer element 106 combined with the additional protrusion 302 attributable to the write heater element 110 results in a further reduction in the spacing between the read/write head 102 and the disk 104 (compared to the decrease in flying height caused by protrusion of the write element 106 alone), and therefore a flying height, $h_{FLY\_WHEAT}$, during the write operation will be further reduced compared to the initial flying height $h_{FLY_i}$ (i.e., $h_{FLY\_WHEAT} = h_{FLY_i}$ – write element protrusion – write heater element protrusion).

Figure 4:
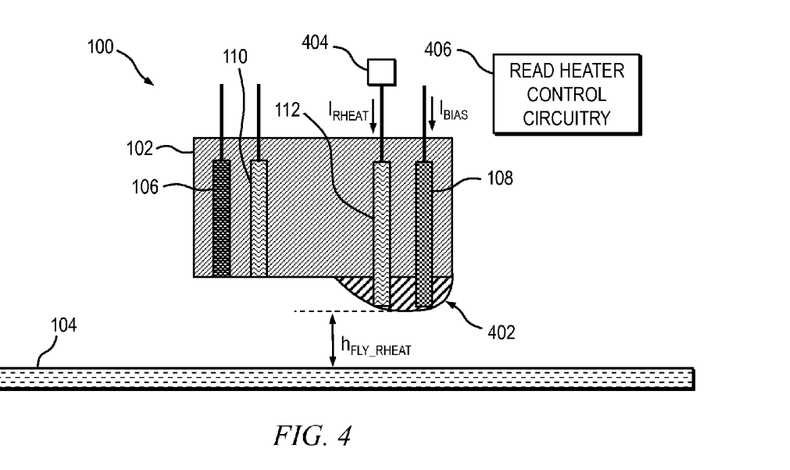
FIG. 4 is a side view depicting at least a portion of the exemplary disk drive apparatus shown in FIG. 1 during a read operation with activation of a read heater element.

FIG. 4 is a side view depicting at least a portion of the exemplary disk drive apparatus 100 shown in FIG. 1 during a read operation with activation of the read heater element 112. Specifically, during the read operation, a read bias current, $I_{BIAS}$, is supplied to the read transducer element 108 in the read/write head 102. Substantially concurrently with activation of the read element 108, the read heater element 112 is activated by supplying a read heater current, $I_{RHEAT}$, to the read heater element via a second control pad 404 during the read operation. The read heater current $I_{RHEAT}$ is generated by read heater control circuitry 406 and is supplied to the read heater element 112 via pad 404.

In this embodiment, the write heater current $I_{WHEAT}$ and the read heater current $I_{RHEAT}$ are supplied to the write and read heater elements, respectively, by separate control pads and corresponding control circuitry during write and read operations, respectively. A combination of the read bias current $I_{BIAS}$ supplied to the read element 108 and the read heater current $I_{RHEAT}$ supplied to the read heater element 112 will cause the read transducer element and the read heater element, respectively, to heat up, thereby causing a protrusion 402 of the read/write head 102 toward the surface of the disk 104. The read bias current $I_{BIAS}$ flowing through the read element 108 will be so negligible (e.g., less than about 100 microwatts (μW)) that substantially all of the protrusion 402 of the read/write head 102, and hence substantially all of the flying height control, will be attributable to the read heater current $I_{RHEAT}$ flowing through the read heater element 112. This protrusion 402 of the read heater element 112 results in a decrease in the spacing between the read/write head 102 and the disk 104, and therefore a flying height, $h_{FLY\_RHEAT}$, during the read operation will be reduced compared to the initial flying height $h_{FLY_i}$ (i.e., $h_{FLY\_W} = h_{FLY_i}$ – read heater element protrusion).

By way of example only and without limitation, a minimum step size (least significant bit (LSB)) of a 10-bit heater is about 200 μW, in one or more embodiments. A ratio of read heater element LSB power over read transducer power could be as much as fifteen times (15×) or as little as two times (2×). In comparison, write transducer power is typically greater than about 1000 μW, or greater than ten times (10×) the read transducer power.

For the exemplary disk drive apparatus 100 shown in FIGS. 3 through 4, the write heater element 110 and the read heater element 112 are controlled by separate currents $I_{WHEAT}$ and $I_{RHEAT}$ respectively, supplied via separate control pads 304, 404 and corresponding heater control circuitry 306, 406. Embodiments of the invention beneficially provide independent control of the read and write heater elements in the read/write head using a single control pad and a single corresponding control circuit. This is accomplished, in accordance with embodiments of the invention, by configuring a resistance of each of the respective read and write heater elements 112, 110 so as to achieve a prescribed current ratio between the read and write heater elements.

Figure 5:
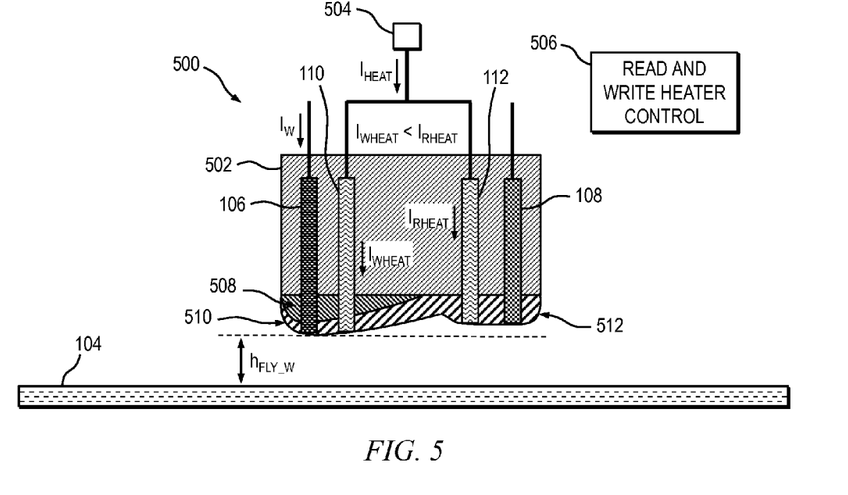
FIG. 5 is a side view depicting at least a portion of an exemplary disk drive apparatus including parallel-connected read and write heater elements during a write mode of operation, according to an embodiment of the invention.

FIG. 5 is a side view depicting at least a portion of an exemplary disk drive apparatus 500 including parallel-connected read and write heater elements 112 and 110, respectively, during a write mode of operation, according to an embodiment of the invention. More particularly, the disk drive apparatus 500 includes at least one read/write head 502 and at least one corresponding rotating magnetic disk 104, or alternative storage medium, on which data can be stored. As in the illustrative disk drive apparatus 100 depicted in FIGS. 1 through 4, the read/write head 502 comprises write transducer element 106 and read transducer element 108. The read/write head 502 further comprises separate write and read heater elements, 110 and 112, respectively. Although depicted in this embodiment as comprising one write heater element 110 and one read heater element 112 in the read/write head 502, embodiments of the invention are not limited to any specific number or placement of the heater elements.

In the exemplary disk drive apparatus 500, the write and read heater elements 110, 112 are connected together in parallel and are positioned proximate to the write transducer element 106 and read transducer element 108, respectively, in the read/write head 502. Specifically, first terminals of the write and read heater elements 110, 112 are connected with a single control pad 504 adapted to receive a heater current, $I_{HEAT}$, supplied thereto, and second terminals of the write and read heater elements are connected with a common return (e.g., ground). The write and read heater elements 110, 112, in one or more embodiments, are formed as resistive elements (e.g., resistors), although embodiments of the invention are not limited to resistive heater elements, but rather may comprise essentially any controllable heat generating elements, including, for example, a chemically-based heat generating element.

The read/write head 502, in a manner consistent with the read/write head 102 shown in FIGS. 1 through 4, is suspended adjacent to a surface of the magnetic disk 104 by a suspension arm and an actuator, neither of which are explicitly shown in FIG. 5, in a conventional manner, as will be known by those skilled in the art. The actuator controls a position of the suspension arm so as to place the read and write transducer elements 108, 106 in the read/write head 502 over selected tracks on the rotating magnetic disk 104 during reading and writing operations. Mechanisms for moving (e.g., rotationally) the magnetic disk 104 relative to a fixed read/write head 502 (e.g., using a disk spindle and drive motor), or alternatively, moving the read/write head relative to a fixed storage medium, or a combination thereof, are well known by those skilled in the art, and therefore a detailed discussion of such mechanisms will not be presented herein.

During a write operation, a write current, $I_W$, is supplied to the write transducer element 106 as previously described. Additionally, during at least a portion of the write operation, the write heater element 110 is activated by supplying a write heater current, $I_{WHEAT}$, to the write heater element. The write current $I_W$ flowing through the write element 106, which may typically be on the order of about 15 to 45 milliamperes (mA), with a preferred range of about 2 to 70 mA, causes the write element to heat up, thereby creating a protrusion 508 of the read/write head 502 toward the surface of the disk 104. Similarly, the write heater current $I_{WHEAT}$ flowing through the write heater element 110, which may be on the order of about 10 to 50 mA, causes the write heater element to heat up, thereby creating a further protrusion 510 of the read/write head 502 toward the surface of the disk 104. Generally, the protrusion 508 attributable to the write element 106 will be greater than the protrusion 510 attributable to the write heater element 110, although this is not always the case. The key is that there is a significant amount of protrusion: about five times the heater LSB and about ten times the reader power. The protrusion 508 attributable to the write transducer element 106 combined with the additional protrusion 510 attributable to the write heater element 110 results in a reduction in the spacing between the read/write head 502 and the disk 104, and therefore a flying height, $h_{FLY\_W}$, during the write operation will be reduced compared to the initial flying height $h_{FLYi}$ (i.e., $h_{FLY\_W}=h_{FLYi}$–write element protrusion–write heater element protrusion).

In order to reduce the number of control pads in the disk drive apparatus 500, the write heater current $I_{WHEAT}$ provided to the write heater element 110, as well as a read heater current, $I_{RHEAT}$, provided to the read heater element 112, are supplied to the read/write head 502 as heater current, $I_{HEAT}$, via the single control pad 504, in this embodiment. In accordance with one or more embodiments, the single control pad may be manufactured on the head or connected together in a head gimbal assembly (HGA), or alternative suspension or head mounting arrangement. A single read and write heater control circuit 506 is operative to generate the heater current $I_{HEAT}$.

It is to be understood that a magnitude of the heater current $I_{HEAT}$ need not be constant (e.g., DC). For example, in one or more embodiments, the control circuit 506, or an alternative controller, is operative to dynamically control the magnitude of the heater current $I_{HEAT}$, or a ratio of the portions of the heater current $I_{HEAT}$ flowing through the respective read and write heater elements, as a function of one or more characteristics of the read and/or write heater elements (e.g., age, temperature, etc.). By way of example only and without limitation, the heater current $I_{HEAT}$ could be selectively changed over time as the read/write head heats up or cools down to thereby maintain a constant fly height. In this embodiment, the control circuit 506 may be operative to monitor one or more characteristics of the read/write head (e.g., temperature) and/or of the environment and to control a magnitude of the current in the read and write heater elements as a function thereof.

Because the read and write heater elements are connected together in parallel, the heater current $I_{HEAT}$ supplied to the read/write head 502 will be divided between the write heater element 110 and the read heater element 112 during both write and read operations. Thus, a sum of the write heater current $I_{WHEAT}$ and the read heater current $I_{RHEAT}$ will be equal to the total heater current $I_{HEAT}$ supplied to the read/write head 502. A ratio of the division of the heater current $I_{HEAT}$ into the constituent write heater current $I_{WHEAT}$ and read heater current $I_{RHEAT}$ will be a function of the respective resistances of the write and read heater elements 110, 112. For example, if the respective resistances of the write and read heater elements 110, 112 were configured to be the same, then $I_{WHEAT}=I_{RHEAT}=I_{HEAT}/2$. Likewise, if the resistance of the write heater element 110 is configured to be twice the resistance of the read heater element 112, then $I_{WHEAT}=I_{HEAT}/3$ and $I_{RHEAT}=2 \cdot I_{HEAT}/3$ (i.e., about 67% of the total heater current $I_{HEAT}$ will flow through the read heater element 112 and about 33% of $I_{HEAT}$ will flow through the write heater element 110). In general, the read and write heater currents can be determined in accordance with the following expressions:

$$I_{RHEAT} = I_{HEAT} \cdot \frac{R_{WHEAT}}{R_{RHEAT} + R_{WHEAT}} \quad (1)$$

$$I_{WHEAT} = I_{HEAT} \cdot \frac{R_{RHEAT}}{R_{RHEAT} + R_{WHEAT}}, \quad (2)$$

where $R_{WHEAT}$ is the resistance of the write heater element 110 and $R_{RHEAT}$ is the resistance of the read heater element 112.

Since the read heater element 112 will receive at least a portion of the overall heater current $I_{HEAT}$ during the write operation, there will be a protrusion 512 of the read/write head toward a surface of the disk 104 attributable to the write heater element and proximate thereto. The spacing between the read/write head 502 proximate the read transducer element 108 and the disk 104 will be reduced as a function of the protrusion 512. In the embodiment shown in FIG. 5, the read and write transducer elements are positioned at opposing sides of the read/write head 502, and thus a flying height of the read/write head will vary according to a side profile of the head.

The extent of the protrusion 512 will be controlled as a function of the resistance of the read heater element 112 relative to the resistance of the write heater element 110, which affects a ratio of the current split between the read and write heater elements, and the amplitude of the overall heater current $I_{HEAT}$ supplied to the read/write head 502. As previously stated, the primary influence controlling the amount of protrusion during the write operation is due to the write current $I_W$. Consequently, a majority of the heater current $I_{HEAT}$ can be diverted to the read heater element 112 without having the protrusion 512 attributable to the read heater element becoming a dominant factor in the flying height $h_{FLY\_W}$ during the write operation. A ratio of the split of the total heater current between the read and write heater elements will generally be a function of prescribed drive characteristics, specifications, design parameters, etc. To accomplish this, the overall protrusion of the read/write head 502 attributable to the write transducer element 106 and the write heater element 110 (i.e., a sum of the protrusions 508 and 510, respectively) is configured to be greater than or equal to the protrusion of the read/write head attributable to the read heater element 112 (i.e., protrusion 512) during the write operation. Configuring the read/write head 502 in this manner will ensure that the read side of the read/write head 502 is not driven into the disk 104 during the write operation.

Figure 6:
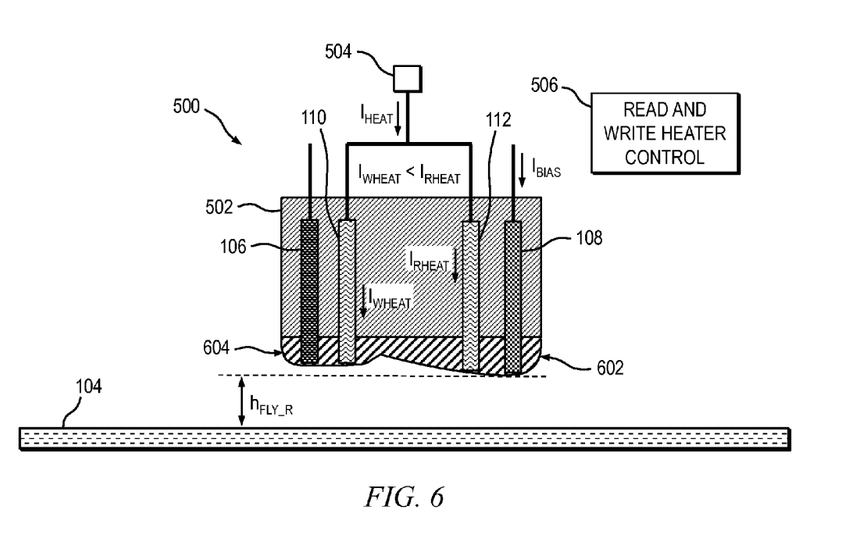
FIG. 6 is a side view depicting at least a portion of the exemplary disk drive apparatus shown in FIG. 5 including parallel-connected read and write heater elements during a read mode of operation, according to an embodiment of the invention.

With reference now to FIG. 6, a side view depicts at least a portion of the exemplary disk drive apparatus 500 shown in FIG. 5 including parallel-connected read and write heater elements 112 and 110, respectively, during a read mode of operation, according to an embodiment of the invention. Specifically, during the read operation, a read bias current, $I_{BIAS}$, is supplied to the read transducer element 108 in the read/write head 502. At substantially the same time as the read element 108 is activated, the read heater element 112 is activated by supplying a read heater current, $I_{RHEAT}$, to the read heater element. In this embodiment, the read heater current $I_{RHEAT}$ and the write heater current $I_{WHEAT}$ are supplied to the read and write heater elements, respectively, by the single control pad 504 and corresponding control circuit 506 during the read operation. Hence, the read heater current $I_{RHEAT}$ is generated as a portion of the overall heater current $I_{HEAT}$ supplied to the read/write head 502. As previously stated, the ratio of heater current $I_{HEAT}$ sent to the read heater element 112 relative to the write heater element 110 will be a function of the respective resistances of the read and write heater elements, as determined in equations (1) and (2) above.

A combination of the read bias current $I_{BIAS}$ supplied to the read element 108 and the read heater current $I_{RHEAT}$ supplied to the read heater element 112 will cause the read transducer element and the read heater element, respectively, to heat up, thereby causing a protrusion 602 of the read/write head 502 toward the surface of the disk 104. Although there will be some slight heating of the read transducer element 108 resulting from the read bias current $I_{BIAS}$ supplied to the read element, and therefore some small but measurable protrusion of the read/write head 502 attributable to the read transducer element, substantially all of the protrusion 602 of the read/write head during the read operation, and hence substantially all of the flying height control, will be attributable to the read heater current $I_{RHEAT}$ flowing through the read heater element 112. More particularly, the amount of the protrusion 602 during the read operation will be determined primarily by the protrusion of the read heater element 112, which is a function of the read heater current $I_{RHEAT}$. This protrusion 602 of the read heater element 112 results in a decrease in the spacing between the read/write head 502 and the disk 104, and therefore a flying height, $h_{FLY\_R}$, during the read operation will be reduced compared to the initial flying height $h_{FLYi}$ (i.e., $h_{FLY\_R} = h_{FLYi}$ –read heater element protrusion).

During the read operation, a portion of the heater current $I_{HEAT}$ will flow through the write heater element 110 causing the write heater element to heat up. As previously stated, the respective resistances of the read and write heater elements are configured, according to one or more embodiments of the invention, such that the read heater current $I_{RHEAT}$ is substantially greater than the write heater current $I_{WHEAT}$. This can be accomplished by making the resistance $R_{WHEAT}$ of the write heater element 110 substantially greater than the resistance $R_{RHEAT}$ of the read heater element 112. The write heater current $I_{WHEAT}$ flowing through the write heater element 110 will cause a slight protrusion 604 of the read/write head 502 toward the surface of the disk 104 during the read operation. However, since the primary factor affecting the extent of this protrusion 604 is the write current $I_W$, which is not supplied during the read operation, the protrusion 604 attributable to the write heater element 110 will be less than the protrusion 602 attributable to the combination of the read heater element 112 and the read transducer element 108, as illustrated in FIG. 6. Configuring the read/write head 502 in this manner will ensure that the write side of the read/write head 502 proximate the write transducer element 106 does not contact the disk 104 during the read operation.

In one or more embodiments, the value (i.e., amount) of the heater current $I_{HEAT}$ supplied to the control pad 504 during the write operation is substantially the same as the value of the heater current supplied to the control pad during the read operation, although other configurations are contemplated. For example, in one or more embodiments, the read and write heater control circuit 506 is configured such that the heater current $I_{HEAT}$ supplied to the control pad 504 during the read operation is different than the heater current supplied during the write operation, depending upon what the drive manufacturer seeks to achieve.

Figure 7:
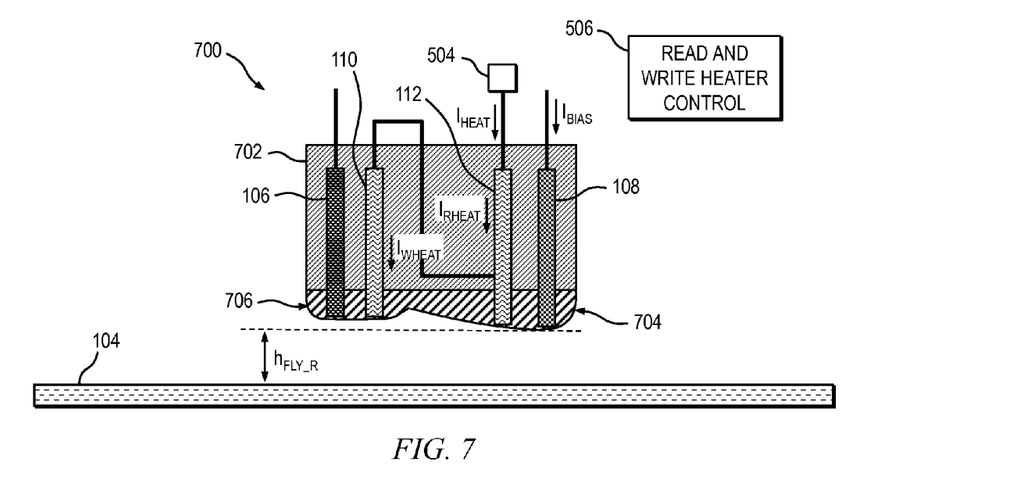
FIG. 7 is a side view depicting at least a portion of an exemplary disk drive apparatus including series-connected read and write heater elements during a read mode of operation, according to an embodiment of the invention.

While an illustrative embodiment of the invention shown in FIGS. 5 and 6 employs parallel-connected read and write heater elements 112, 110, embodiments of the invention are not limited to such a connection arrangement. By way of example only and without limitation, FIG. 7 is a side view depicting at least a portion of an exemplary disk drive apparatus 700 including series-connected read and write heater elements during a read mode of operation, according to an embodiment of the invention. More particularly, the disk drive apparatus 700 includes at least one read/write head 702 and at least one corresponding rotating magnetic disk 104, or alternative storage medium, on which data can be stored. As in the illustrative disk drive apparatus 100 depicted in FIGS. 1 through 4, the read/write head 702 comprises write transducer element 106 and read transducer element 108. The read/write head 702 further comprises separate write and read heater elements, 110 and 112, respectively. Although depicted in this embodiment as comprising one write heater element 110 and one read heater element 112 in the read/write head 702, embodiments of the invention are not limited to any specific number or placement of the heater elements.

In the exemplary disk drive apparatus 700, the write and read heater elements 110, 112 are connected together in series and are positioned proximate to the write transducer element 106 and read transducer element 108, respectively, in the read/write head 702. Specifically, a first terminal of the read heater element 112 is connected with a single control pad 504 adapted to receive the heater current $I_{HEAT}$ supplied thereto, a second terminal of the read heater element is connected with a first terminal of the write heater element 110, and a second terminal of the write heater element is connected with a common return (e.g., ground). The write and read heater elements 110, 112 are, in one or more embodiments, formed as resistive elements (e.g., resistors), although embodiments of the invention are not limited to resistive heater elements.

Figure 8:
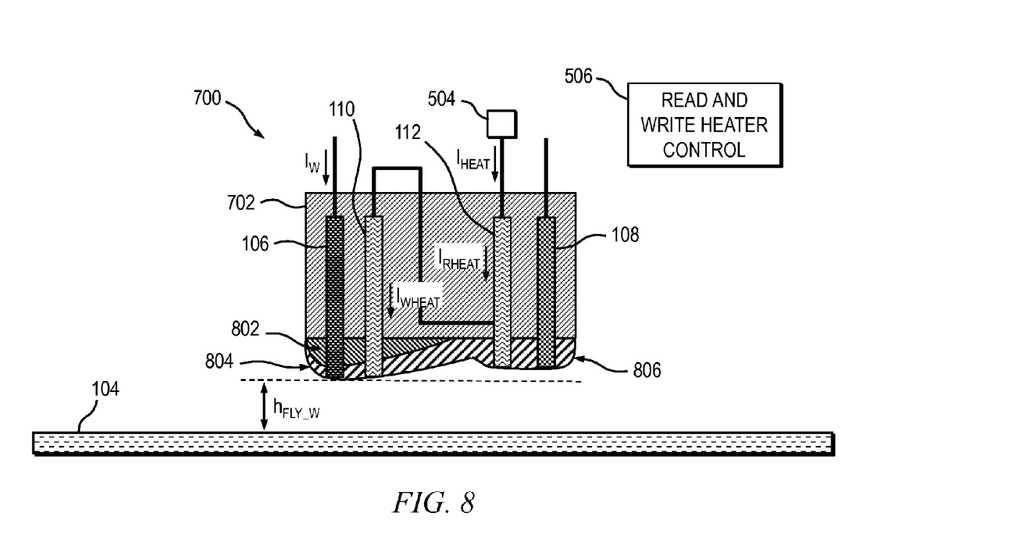
FIG. 8 is a side view depicting at least a portion of the exemplary disk drive apparatus shown in FIG. 7 including series-connected read and write heater elements during a write mode of operation, according to an embodiment of the invention.

Although for the embodiment shown in FIGS. 7 and 8, the current $I_{HEAT}$ is first supplied to the read heater element 112 and the write heater element 110 is connected with the common return (e.g., ground), one or more embodiments may be configured such that the current $I_{HEAT}$ is first supplied to the write heater element and the read heater element 112 is connected with the common return. In this alternative embodiment, current would flow through the read and write heater elements in reverse. However, in a bidirectional heater element such as, for example, a resistor, it is the magnitude of the current flowing through the element rather than the direction of the current which affects the amount of heat generated in the heater element.

The read/write head 702, in a manner consistent with the read/write head 102 shown in FIGS. 1 through 4, is suspended adjacent to a surface of the magnetic disk 104 by a suspension arm and an actuator, neither of which are explicitly shown in FIG. 7, in a conventional manner, as will be appreciated by those skilled in the art. The actuator controls a position of the suspension arm so as to place the read and write transducer elements 108, 106 in the read/write head 702 over selected tracks on the rotating magnetic disk 104 during reading and writing operations. Mechanisms for moving (e.g., rotationally) the magnetic disk 104 relative to a fixed read/write head 702 (e.g., disk spindle and drive motor), or alternatively, moving the read/write head relative to a fixed storage medium, or a combination thereof, are well known by those skilled in the art, and therefore a detailed discussion of such mechanisms will not be presented herein.

In order to reduce the number of control pads in the disk drive apparatus 700, the write heater current $I_{WHEAT}$ provided to the write heater element 110, as well as a read heater current, $I_{RHEAT}$, provided to the read heater element 112, are supplied to the read/write head 702 as heater current $I_{HEAT}$ via the single control pad 504. The read and write heater control circuit 506 is operative to generate the heater current $I_{HEAT}$. Since the read and write heater elements are connected together in series, the same heater current $I_{HEAT}$ supplied to the read/write head 702 will flow through both the write heater element 110 and the read heater element 112 during write and read operations. The read/write head 702, in this embodiment, is configured such that the heat generated by the read heater element 112 is greater than the heat generated by the write heater element 110. To accomplish this, with the same current $I_{HEAT}$ flowing through both the write and read heater elements, the resistance $R_{RHEAT}$ of the read heater element 112 is made to be greater than the resistance $R_{WHEAT}$ of the write heater element 110 to thereby made the power dissipation in the read heater element greater (since $P=I^2R$, where P is power in watts, I is current in amperes and R is resistance in ohms).

During the read operation, a read bias current, $I_{BIAS}$, is supplied to the read transducer element 108 in the read/write head 702. At substantially the same time as the read element 108 is activated, the read heater element 112 is activated by supplying the read heater current $I_{RHEAT}$ to the read heater element. In this embodiment, the read heater current $I_{RHEAT}$ and the write heater current $I_{WHEAT}$ supplied to the read and write heater elements, respectively, via the control pad 504 during the read operation will be equal to $I_{HEAT}$ generated by the control circuit 506 due to the series connection of the read and write heater elements (i.e., $I_{RHEAT}=I_{WHEAT}=I_{HEAT}$).

A combination of the read bias current $I_{BIAS}$ supplied to the read element 108 and the heater current $I_{HEAT}$ supplied to the read heater element 112 will cause the read transducer element and the read heater element, respectively, to heat up, thereby causing a protrusion 704 of the read/write head 702 toward the surface of the disk 104. Although there will be some slight heating of the read transducer element 108 resulting from the read bias current $I_{BIAS}$ supplied to the read element, and therefore some small but measurable protrusion of the read/write head 702 attributable to the read transducer element, substantially all of the protrusion 704 of the read/write head during the read operation, and thus substantially all of the flying height control, will be attributable to the heater current $I_{HEAT}$ flowing through the read heater element 112. More particularly, the amount of the protrusion 704 during the read operation will be determined primarily by the protrusion of the read heater element 112, which is a function of the heater current $I_{HEAT}$. This protrusion 704 of the read heater element 112 results in a decrease in the spacing between the read/write head 702 and the disk 104, and therefore a flying height, $h_{FLY\_R}$, during the read operation will be reduced compared to the initial flying height $h_{FLY}$ (i.e., $h_{FLY\_R}=h_{FLY}$–read heater element protrusion).

During the read operation, the heater current $I_{HEAT}$ will also flow through the write heater element 110 causing the write heater element to heat up somewhat. As previously stated, the respective resistances of the read and write heater elements are configured, according to one or more embodiments of the invention, such that the read heater resistance $R_{RHEAT}$ is substantially greater than the write heater resistance $R_{WHEAT}$, so that the heat generated by the read heater element is greater compared to the heat generated by the write heater element.

The component of the heater current $I_{HEAT}$ (namely, $I_{WHEAT}=I_{HEAT}$) flowing through the write heater element 110 will cause a slight protrusion 706 of the read/write head 702 toward the surface of the disk 104 during the read operation. However, since the primary factor affecting the extent of this protrusion 706 is the write current $I_W$ flowing through the write transducer element 106, which current is not supplied during the read operation, the protrusion 706 attributable to the write heater element 110 will be less than the protrusion 704 attributable to the combination of the read heater element 112 and the read transducer element 108, as illustrated in FIG. 7. Configuring the read/write head 702 in this manner will ensure that the write side of the read/write head 702 proximate the write transducer element 106 does not contact the disk 104 during the read operation.

Likewise, FIG. 8 is a side view depicting at least a portion of the exemplary disk drive apparatus 700 shown in FIG. 7 including series-connected read and write heater elements during a write mode of operation, according to an embodiment of the invention. During the write operation, a write current, $I_W$, is supplied to the write transducer element 106 as previously described. Additionally, during at least a portion of the write operation, the write heater element 110 is activated by supplying the heater current $I_{HEAT}$ to the write heater element. The write current $I_W$ flowing through the write element 106 causes the write element to heat up, thereby creating a protrusion 802 of the read/write head 702 toward the surface of the disk 104. Similarly, the component of the heater current $I_{HEAT}$ (namely, $I_{WHEAT}=I_{HEAT}$) flowing through the write heater element 110 causes the write heater element to heat up, thereby creating a further protrusion 804 of the read/write head 702 toward the surface of the disk 104. The protrusion 802 attributable to the write element 106 will generally be substantially greater than the protrusion 804 attributable to the write heater element 110. The protrusion 802 attributable to the write transducer element 106 combined with the additional protrusion 804 attributable to the write heater element 110 results in a reduction in the spacing between the read/write head 702 and the disk 104, and therefore a flying height, $h_{FLY\_W}$, during the write operation will be reduced compared to the initial flying height $h_{FLY}$ (i.e., $h_{FLY\_W}=h_{FLY}$–write element protrusion–write heater element protrusion).

The read heater element 112 will also receive the heater current $I_{HEAT}$ during the write operation, and thus there will be a protrusion 806 of the read/write head toward a surface of the disk 104 attributable to the read heater element and proximate thereto. The spacing between the read/write head 702 proximate the read transducer element 108 and the disk 104 will be reduced as a function of the protrusion 806. However, even with the heater current $I_{HEAT}$ flowing through the read heater element 112 during write operation, the overall protrusion of the read/write head 702 attributable to the write transducer element 106 and the write heater element 110 (i.e., a sum of the protrusions 802 and 804, respectively) is configured to be greater than or equal to the protrusion of the read/write head attributable to the read heater element 112 (i.e., protrusion 806) during the write operation. Configuring the read/write head 702 in this manner will ensure that the read side of the read/write head does not contact the surface of the disk 104 during the write operation.

At least a portion of the embodiments of the invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with embodiments of the invention can be employed in essentially any application and/or electronic system in which a disk drive is used, particularly to control heads employing two-dimensional technology. Suitable applications and systems for implementing techniques according to embodiments of the invention may include, but are not limited to, personal computers, data storage systems, servers, networking systems, etc. Systems incorporating such integrated circuits are considered part of embodiments of the invention. Given the teachings of embodiments of the invention provided herein, one of ordinary skill in the art will be able to contemplate other implementations and applications of the techniques of embodiments of the invention.

Figure 9:
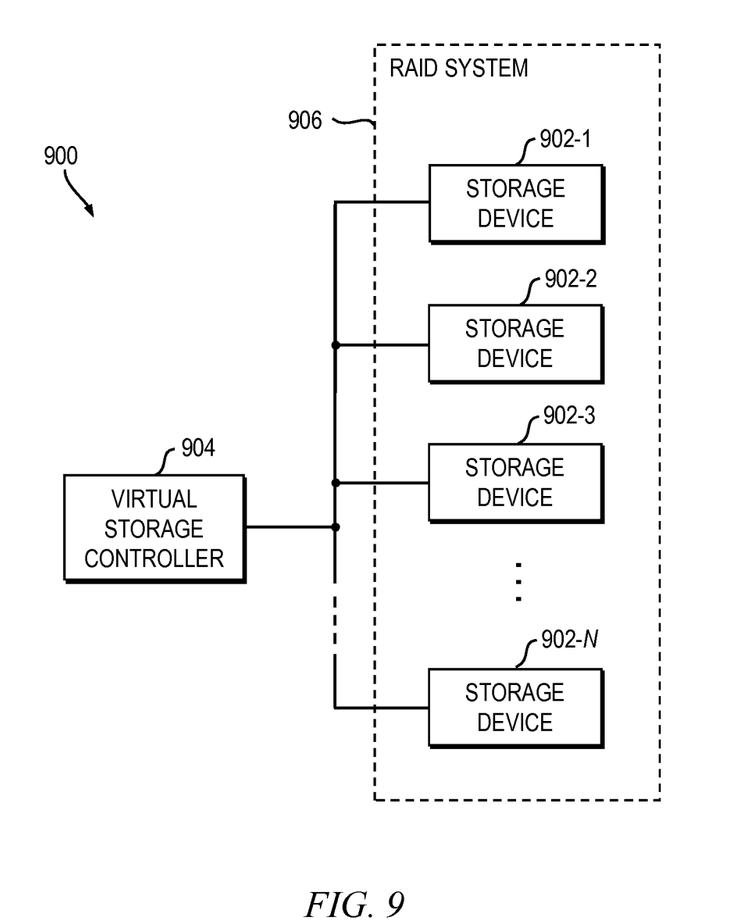
FIG. 9 is a block diagram depicting at least a portion of an exemplary virtual storage system comprising multiple storage devices, at least one of the storage devices incorporating techniques for reducing flying height, according to an embodiment of the invention.

Embodiments of the invention are suitable for use in conjunction with a virtual storage system 900 comprising multiple storage devices 902-1 through 902-N, possibly of various different types, as illustrated in FIG. 9. The virtual storage system 900, also referred to as a storage virtualization system, illustratively comprises a virtual storage controller 904 coupled with a redundant array of independent disks (RAID) system 906. As will be known by those skilled in the art, RAID is a storage technology which provides increased reliability, among other features, through redundancy. This is accomplished by combining multiple physical disk drive components into a logical (i.e., virtual) unit, where data is distributed across the multiple drives in one of a plurality of ways, generally referred to as "RAID levels." The RAID system 906 more specifically comprises N distinct storage devices denoted 902-1, 902-2, ... 902-N, where N is an integer greater than one, at least one of which is an HDD. Furthermore, one or more of the HDDs of the RAID system 906 are assumed to be configured to include apparatus and/or circuitry as disclosed herein. These and other virtual storage systems comprising HDDs, or some combination of HDDs and other storage devices (e.g., solid-state drives (SSDs)), are considered embodiments of the invention.

The embodiments of the invention described herein are intended to provide a general understanding of the various embodiments, and are not intended to serve as a complete description of all the elements and features of apparatus and systems that might make use of the structures described herein. Other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other embodiments of the invention. Although embodiments of the invention have been described herein with reference to the accompanying drawings, it is to be understood that embodiments of the invention are not limited to the described embodiments, and that various other embodiments within the scope of the following claims will be apparent to those skilled in the art given the teachings herein.

What is claimed is:

1. A method of reducing flying height in a disk drive apparatus, the method comprising steps of:
    providing at least one read/write head, the read/write head comprising at least one read transducer element, at least one write transducer element, at least one read heater element, and at least one write heater element;
    configuring the read and write heater elements such that heat dissipated in the read heater element is greater than heat dissipated in the write heater element; and
    supplying a current to the read and write heater elements via a same control pad during at least a portion of a read operation and during at least a portion of a write operation, wherein during the write operation, a protrusion of the read/write head toward a surface of a magnetic storage medium corresponding to the read/write head attributable to the write transducer element and the write heater element is greater than a protrusion of the read/write head toward the surface of the magnetic storage medium attributable to the read heater element, and wherein during the read operation, a protrusion of the read/write head toward a surface of the magnetic storage medium attributable to the read heater element and the read transducer element is greater than a protrusion of the read/write head attributable to the write heater element.

2. The method of claim 1, further comprising positioning the at least one read heater element proximate to the read transducer element, and positioning the at least one write heater element proximate to the write transducer element.

3. The method of claim 1, further comprising positioning the read and write transducer elements at opposing ends of the at least one read/write head.

4. The method of claim 1, further comprising providing a control circuit operative to generate the current supplied to the read and write heater elements.

5. The method of claim 1, further comprising connecting the read and write heater elements together in parallel.

6. The method of claim 1, further comprising connecting the read and write heater elements together in series.

7. The method of claim 1, wherein the step of configuring the read and write heater elements comprises configuring a first resistance of the read heater element relative to a second resistance of the write heater element so that heat dissipated in the read heater element is greater than heat dissipated in the write heater element.

8. The method of claim 7, further comprising connecting the read and write heater elements together in parallel, whereby the current supplied to the read and write heater elements is divided between the read and write heater elements as a function of a ratio of the first and second resistances.

9. The method of claim 8, wherein the step of configuring the first and second resistances of the read and write heater elements, respectively, comprises configuring the second resistance to be greater than the first resistance, such that a first portion of the current supplied to the read and write heater elements via the control pad flowing through the read heater element is greater compared to a second portion of the current flowing through the write heater element.

10. The method of claim 7, further comprising connecting the read and write heater elements together in series, whereby power dissipated in each of the respective read and write heater elements is controlled as a function of a ratio of the first and second resistances.

11. The method of claim 7, wherein the step of configuring the first and second resistances of the read and write heater elements, respectively, comprises configuring the first resistance to be greater than the second resistance, such that power dissipation in the read heater element is greater compared to power dissipation in the write heater element.

12. The method of claim 1, further comprising dynamically controlling the current supplied to the read and write heater elements over time as a function of at least one characteristic of at least one of the read and write heater elements to thereby maintain a substantially constant flying height.

13. A read/write head for reducing flying height in a disk drive apparatus, the read/write head comprising:
- at least one write transducer element operative to store binary encoded information on a storage medium;
- at least one read transducer element operative to decode stored binary information from the storage medium;
- at least one read heater element and at least one write heater element, the read and write heater elements being configured so that during read and write operations, heat dissipated in the read heater element is greater than heat dissipated in the write heater element; and
- a control pad adapted to receive a current supplied to the read and write heater elements during at least a portion of the read operation and during at least a portion of the write operation;
- wherein during the write operation, a protrusion of the read/write head toward a surface of a magnetic storage medium in the disk drive apparatus corresponding to the read/write head attributable to the write transducer element and the write heater element is greater than a protrusion of the read/write head toward the surface of the magnetic storage medium attributable to the read heater element, and wherein during the read operation, a protrusion of the read/write head toward a surface of the magnetic storage medium attributable to the read heater element and the read transducer element is greater than a protrusion of the read/write head attributable to the write heater element, such that flying height of the disk drive apparatus is reduced.

14. The read/write head of claim 13, further comprising a control circuit coupled with the control pad and operative to generate the current supplied to the read and write heater elements.

15. The read/write head of claim 14, wherein the control circuit is operative to dynamically control the current supplied to the read and write heater elements over time as a function of at least one characteristic of at least one of the read and write heater elements to thereby maintain a substantially constant flying height in the disk drive apparatus.

16. The read/write head of claim 13, wherein the at least one read heater element is positioned proximate to the read transducer element, and the at least one write heater element is positioned proximate to the write transducer element.

17. The read/write head of claim 13, wherein the read and write transducer elements are positioned at opposite ends of the read/write head.

18. The read/write head of claim 13, wherein the read and write heater elements are connected together in parallel.

19. The read/write head of claim 13, wherein the read and write heater elements are connected together in series.

20. The read/write head of claim 13, wherein the at least one read heater element has a first resistance associated therewith and the at least one write heater element has a second resistance associated therewith, the first resistance of the read heater element being configured relative to the second resistance of the write heater element such that during read and write operations, heat dissipated in the read heater element is greater than heat dissipated in the write heater element.

21. The read/write head of claim 20, wherein power dissipated in each of the read and write heater elements is controlled as a function of a ratio of the first and second resistances.

22. The read/write head of claim 13, wherein at least a portion of the read/write head is fabricated in at least one integrated circuit.

23. A data storage system, comprising:
- at least one disk drive apparatus having reduced flying height, the disk drive apparatus comprising:
  - a magnetic storage medium; and
  - a read/write head comprising:
    - at least one write transducer element operative to store binary encoded information on the magnetic storage medium;
    - at least one read transducer element operative to decode stored binary information from the magnetic storage medium;
    - at least one read heater element and at least one write heater element, the read and write heater elements being configured so that during read and write operations, heat dissipated in the read heater element is greater than heat dissipated in the write heater element; and
    - a control pad adapted to receive a current supplied to the read and write heater elements during at least a portion of the read operation and during at least a portion of the write operation;
    - wherein during the write operation, a protrusion of the read/write head toward a surface of the magnetic storage medium attributable to the write transducer element and the write heater element is greater than a protrusion of the read/write head toward the surface of the magnetic storage medium attributable to the read heater element, and wherein during the read operation, a protrusion of the read/write head toward a surface of the magnetic storage medium attributable to the read heater element and the read transducer element is greater than a protrusion of the read/write head attributable to the write heater element, such that flying height of the disk drive apparatus is reduced.

24. The system of claim 23, wherein the at least one disk drive apparatus comprises a plurality of disk drives, each of at least a subset of the disk drives including a disk drive apparatus having reduced flying height, the plurality of disk drives being configured to form a redundant array of independent disks (RAID) system.

* * * * *